Patented Nov. 27, 1945

2,389,950

UNITED STATES PATENT OFFICE 2,389,950

PRODUCTION OF DI-CARBOXYLIC ACIDS

John George Mackay Bremner, Robert Holroyd Stanley, David Gwyn Jones, and Arthur William Charles Taylor, Norton-on-Tees, England, assignors to Imperial Chemical Industries Limited, a corporation of Great Britain No Drawing. Application October 11, 1943, Serial No. 505,888. In Great Britain November 4, 1942

3 Claims. (Cl. 260—530)

This invention relates to the production of di-carboxylic acids and in particular to the production of glutaric acid.

According to the present invention glutaric acid is produced by treating δ-hydroxyvaleric aldehyde with nitric acid such that the concentration of the said nitric acid in the reaction mixture is at least 20% by weight based on the free nitric acid plus water present in the reaction mixture, the temperature of the reaction mixture being maintained below about 30° C., and preferably below about 20° C., after reaction is initiated.

In the presence of water, there is an equilibrium between δ-hydroxyvaleric aldehyde and its isomer 1.5-epoxy pentanol-5. It should be understood therefore that the process of the present invention is applicable to δ-hydroxyvaleric aldehyde, its isomer 1.5-epoxy pentanol-5 or to mixtures containing these compounds.

We have found it convenient to use the crude solution containing δ-hydroxyvaleric aldehyde obtained by the hydration in the presence of acids, of dihydropyran as described in co-pending application Ser. No. 485,090. Preferably we use the crude solution obtained by the hydration of dihydropyran in the presence of nitric acid, without removing the residual nitric acid from the crude solution.

In the process of the present invention the yield of glutaric acid is decreased if the reaction is allowed to proceed at excessively high temperatures. Furthermore, the product is discoloured and impure so that it requires additional treatment to produce a satisfactory product. Therefore, when the reaction is proceeding at a satisfactory rate the temperature of the reaction mixture during reaction should be maintained below about 30° C., and preferably below about 20° C. When reaction has been initiated, the temperature of the reaction mixture may be maintained at a suitable value by cooling the reaction vessel, by the provision in it of suitable stirring arrangements and by the addition, at a controlled rate, of δ-hydroxyvaleric aldehyde to nitric acid solution. It should be understood that for the purpose of temperature control, δ-hydroxyvaleric aldehyde and nitric acid solution may be introduced at controlled rates simultaneously into the reaction vessel, and when reaction has been initiated, one or both of the reactants may be pre-cooled as desired before adding them to the reaction vessel.

When treating δ-hydroxyvaleric aldehyde with nitric acid according to the present invention and in the absence of the compounds hereinafter defined, it is necessary to warm the reactants or the reactant mixture to initiate the reaction. The temperature to which the reactants or the reactant mixture is warmed may vary considerably, for example according to the concentration of the nitric acid used, but in general a temperature of about 60° C. is satisfactory.

With excessively high concentrations of nitric acid, decomposition of δ-hydroxyvaleric aldehyde occurs. It is preferred therefore to have in the reaction mixture a nitric acid concentration of 45% to 65% by weight based on the free nitric acid plus water present in the reaction mixture. The whole or a portion of the nitric acid solution to be used in the reaction may be placed at once in the reaction vessel before commencing the addition of the δ-hydroxyvaleric aldehyde. When a portion of the nitric acid solution is initially present in the reaction vessel the remainder may be added simultaneously with the δ-hydroxyvaleric aldehyde, the rates of addition preferably being controlled in order to maintain the reaction mixture within the preferred temperature range, after reaction has been initiated. More preferably the further additions of nitric acid solution are such that there is maintained in the reaction mixture a nitric acid concentration of about 55% by weight, based on the free nitric acid plus water present in the reaction mixture.

The proportion of nitric acid to δ-hydroxyvaleric aldehyde may vary within wide limits. While stoichiometric proportions may be used, it is desirable to use an excess of nitric acid, for example 4 parts by weight of nitric acid to 1 part by weight of δ-hydroxyvaleric aldehyde.

When δ-hydroxyvaleric aldehyde is treated with nitric acid according to the present invention there is an induction period, which varies according to the strength of the nitric acid solution used, before reaction sets in at a satisfactory rate. We have further found that this induction period can be decreased or even substantially avoided if there is initially present in the reaction mixture a metal nitrite, preferably an alkali metal nitrite such as sodium nitrite, the quantity of which may vary over fairly wide limits. It is convenient to provide for the presence, in the nitric acid solution initially present in the reaction vessel, of 1% by weight of metal nitrite: thus, if the whole of the nitric acid solution to be used in the reaction is initially present in the reaction vessel then about 1% of its weight of for example sodium nitrite may be dissolved therein, before commencing the addition of δ-hydroxyvaleric aldehyde, while if only a portion of the nitric acid solution is initially present in the reaction vessel, then sodium nitrite to the extent of 1% by weight of such portion may be dissolved therein.

When the process of the present invention is operated in the presence of a metal nitrite and with nitric acid concentrations of less than about 35% by weight, based on the free nitric acid plus water present in the reaction mixture, it is necessary to initiate reaction by warming as hereinbefore described. With nitric acid concentrations of more than about 35% by weight and in the presence of a metal nitrite, such warming is in general unnecessary to initiate the reaction, while in the presence of a metal nitrite and using concentrations of nitric acid within the preferred range, that is with concentrations of 45% to 65% by weight based on the free nitric acid plus water present in the reaction mixture, it is even desirable to precool the nitric acid solution to below 5° C. for the purpose of temperature control.

The hereinbefore mentioned induction period can also be decreased or substantially avoided if a portion of the crude liquid product from a previous reaction according to the present invention, that is a product containing residual nitric acid and oxides of nitrogen, is added to one or both of the initial reactants. Alternatively the reactants may be added to a portion of such crude liquid produced contained in the reaction vessel.

When the reaction between the δ-hydroxyvaleric aldehyde and the nitric acid solution is complete, the liquid reaction product may be treated in any suitable manner for the recovery of solid glutaric acid. Nitrogen dioxide may be removed by raising the temperature of the liquid reaction product, after which it may be evaporated to dryness under vacuum and by the application of steam heating. The crude solid may then be redissolved in water and the evaporation repeated. Final crystallization from an organic solvent such as benzene yields glutaric acid of good appearance and purity.

*Example 1*

370 grams of nitric acid containing 65% by weight of nitric acid were cooled to 0° C., in a stirred reaction vessel and 3.7 grams of sodium nitrite added. When the sodium nitrite was substantially dissolved, addition of δ-hydroxyvaleric aldehyde was commenced. The temperature of the reaction mixture was maintained below 20° C., by regulating the rate of addition of the aldehyde by stirring and by cooling the reaction vessel with a freezing mixture. When 70 grams of aldehyde had been added, the mixture was stirred for an hour while allowing the temperature to rise, whereby copious fumes of nitrogen dioxide were evolved. The solution was then evaporated to dryness under a vacuum and by steam heating. 50 mls. of water were added to the residue and the evaporation repeated. The residue was finally recrystallized from benzene whereby 80 grams of glutaric acid having a melting point of 93° C. to 95° C. were obtained, representing a yield of 89% on the aldehyde used.

*Example 2*

2 kgs. of nitric acid containing 55% by weight of nitric acid were cooled to below 5° C., and 20 grams of sodium nitrite added, while stirring. When the sodium nitrite was substantially dissolved, addition of crude liquid reaction product from the hydration of dihydropyran with nitric acid according to co-pending application Ser. 485,090 as hereinbefore defined, and of nitric acid containing 98% by weight of nitric acid, from separate containers, was commenced. The rates of crude aldehyde addition and of nitric acid were such as to maintain the temperature of the reaction mixture below 20° C., and the concentration of nitric acid in the reaction mixture at about 55% by weight based on the free nitric acid plus water present in the reaction mixture. In all, crude aldehyde from the hydration of 5 kg. of dihydropyran were added. The green solution was allowed to rise in temperature whereby there was a copious evolution of nitrogen dioxide. When evolution of nitrogen dioxide was complete the pale yellow solution was evaporated to dryness under vacuum, with steam heating. The residue was recrystallized from benzene when 5.1 kgs. of glutaric acid having a melting point of 92° C. and an equivalent weight of 65.2 were obtained, representing a yield of 70% on the aldehyde used.

We claim:

1. A process for the production of glutaric acid which comprises the steps of adding δ-hdyroxyvaleric aldehyde to nitric acid, the said nitric acid containing 1% of its weight of sodium nitrite, and being precooled to a temperature below 5° C., the concentration of the said nitric acid being maintained at 55% by weight based on the free nitric acid plus water present in the reaction mixture, the temperature of the reaction mixture being maintained below 20° C.

2. A process for the production of glutaric acid which comprises the steps of dissolving in a quantity of nitric acid 1% of its weight of sodium nitrite, the said nitric acid having a concentration of 55% by weight and being cooled to a temperature below 5° C., adding to the solution of sodium nitrite in nitric acid δ-hydroxyvaleric aldehyde and further quantities of nitric acid, such that there is maintained in the reaction mixture nitric acid having a concentration of 55% by weight based on the free nitric acid plus water present in the reaction mixture, maintaining the reaction mixture at a temperature below 20° C., the total quantity of nitric acid used being in excess of that required stoichiometrically to convert the whole of the δ-hydroxyvaleric aldehyde to glutaric acid.

3. A process for the production of glutaric acid which comprises the steps of adding delta-hydroxyvaleric aldehyde to nitric acid, the said nitric acid containing, as an agent to reduce the induction period of the reaction, sodium nitrite, said nitric acid being precooled to a temperature below 5° C., the concentration of said nitric acid being maintained at between 45 and 65% by weight based on the free nitric acid plus water present in the reaction mixture, the temperature of the reaction mixture being maintained below 20° C.

JOHN GEORGE MACKAY BREMNER.
ROBERT HOLROYD STANLEY.
DAVID GWYN JONES.
ARTHUR WILLIAM CHARLES TAYLOR.